Aug. 30, 1938.　　　　A. G. HALL　　　　2,128,410
MULTICONDUCTOR SIGNALING CABLE
Filed May 2, 1936
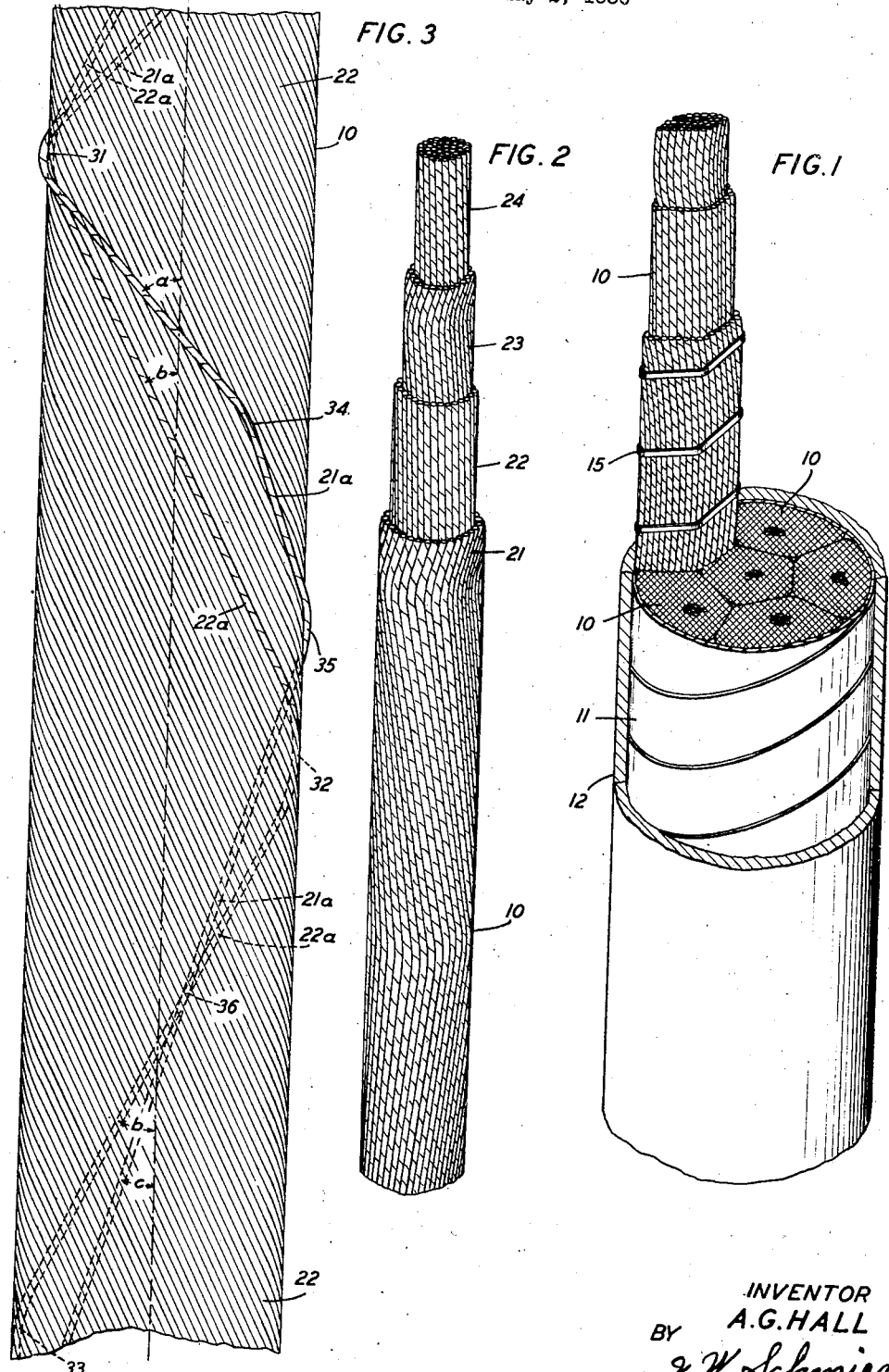
INVENTOR
A.G. HALL
BY J.W. Schmied
ATTORNEY Patented Aug. 30, 1938

2,128,410

UNITED STATES PATENT OFFICE 2,128,410

MULTICONDUCTOR SIGNALING CABLE

Arthur G. Hall, Cranford, N. J., assignor to Bell Telephone Laboratories, Incorporated, New York, N. Y., a corporation of New York Application May 2, 1936, Serial No. 77,521

10 Claims. (Cl. 173—81)

This invention relates to signaling cables and particularly to cables of this type which comprise a plurality of individually insulated conductor units such as paper insulated pairs or quads.

It is an object of the invention to provide a cable of this type in which the interference effects between the conductor units is reduced.

In a well-known cable construction, which may involve as many as 1,200 conductor units, the conductor units have been placed in concentric layers and the layers have been applied with alternate directions of lay with the object of reducing the interference effects between conductors in adjacent layers. With this arrangement each conductor unit in a cable section crosses all the units in the adjacent layers a number of times, with the result that a large number of crossing points are established. The interference effect of each of these crossing points is small as compared with the effect between two units which are running parallel throughout their length.

In another well-known cable construction known as the "unit type" of cable the conductors are divided into a few groups or cable units each containing from 25 to 100 conductor units. The conductor units in each group are usually run parallel and the group is given a slight twist about its axis in order to give it flexibility. A number of such groups totaling the required number of conductor units are then stranded together and passed through a die whereby the groups are compressed so that the outer surface of the cable will be cylindrical, each group attaining a somewhat angular form, like a sector. A cable of this type is described in Patent 1,727,971, issued to L. S. Ford September 10, 1929.

The conductor units in this latter type of cable are placed in fairly well defined layers and each conductor unit will be adjacent to about half a dozen other units throughout the length of a cable section. It is evident that due to this adjacent relation a conductor unit will be subject to strong interference effects from only a few other conductor units, which may be objectionable.

It is therefore a further object of the invention to combine in a section of multi-conductor cable the advantages of the unit type of cable construction with the advantage of reduced interference attainable by the first-mentioned type of cable construction.

In accordance with the invention a cable or a cable unit comprising a plurality of conductor units is stranded with its conductor units forming a plurality of layers and with the conductor units of certain layers being stranded with a zigzag lay relative to the conductors in the adjacent layers. In this manner each conductor in a zigzag layer will repeatedly cross some or all of the conductors in an adjacent layer at a small angle and alternately in opposite directions along the length of the cable section with the result that the interference effect is reduced to a degree nearly equal to that obtained in cables having adjacent layers continuously spiralled in opposite directions.

For a better understanding of the invention a description of a preferred embodiment will now be given and reference will be made to the accompanying drawing in which:

Fig. 1 shows a portion of a cable section in perspective with one of the cable units protruding;

Fig. 2 shows a bundle of conductor units, such as those forming a cable unit in Fig. 1, with the conductor layers exposed to illustrate their stranding; and Fig. 3 is a schematic view illustrating the zigzag relation between conductors in two adjacent layers in a cable unit, both layers being continuously spiralled in the same direction.

The cable shown in Fig. 1 comprises six groups or cable units 10, namely a central group surrounded by five outside groups, compressed to form a cylindrical cable; the outer surface may be surrounded by a protecting layer of insulation 11 and a lead sheath 12.

Each group 10 may comprise as many as one hundred conductor units and each conductor unit may consist of a single conductor, a pair, or a quad of conductors. The individual conductors are usually insulated by a paper envelope enclosing a considerable air space about the conductor; paper pulp is also frequently used as insulation and other materials and modes of insulation may be used without a departure from the principles of the invention.

When a group 10 of conductors is first formed it will have its conductors arranged in concentric layers 21, 22, 23, etc., as shown in Fig. 2 and the group will be generally cylindrical in shape. Six such groups or cable units 10 are then passed through a shaping die whereby they are compressed to take the shape shown in Fig. 1 whereupon the tape 11 and the lead sheath 12 are applied.

In stranding the group 10 shown in Fig. 2 the conductors in layer 22 may be applied to form straight lines substantially parallel with the axis of the cable. The conductors in the adjacent layer 21 would then be applied about the layer 22 in such a manner that the center line of each conductor unit in the layer 21 forms a spiral line about the layer 22 running in one direction for a portion of the cable section and then reversed into a spiral line running in the opposite direction in the next succeeding portion of the cable section. Each conductor in layer 21 may thus be shifted through an angle of 180 degrees about the layer 22 and thus will cross and engage half of the conductors in layer 22 once for each reversal of direction. This spiral shift may, of course, be more or less than 180 degrees and the angle formed with the conductors in layer 22 may be such that a reversal of direction will take place once for every 50 or 100 feet, for example.

In order that a cable unit, such as that shown in Fig. 2, may have sufficient flexibility for the usual handling, it is desirable that all the layers should have a spiral lay. This could be attained in the simplest way by twisting the entire cable unit after its stranding, at the same time retaining the zigzag relation between adjacent layers. It is, however, preferable to obtain this cable construction by applying alternate layers 22 and 24 each with a given desired angle of lay throughout the cable section, and applying the alternate layers 21 and 23 each with an angle of lay repeatedly changing between a slightly higher to a slightly lower value than the fixed angle of lay of layers 22 and 24. Thus the layers 22 and 24 may have a constant pitch of say two feet, and the pitch of layer 23 would be alternately slightly more and slightly less than two feet in successive portions of the cable section, the change in pitch occurring say at fifty foot intervals. In this manner the zigzag relation between adjacent layers is retained and the zigzagging conductors will be continuously spiralled about the cable, as shown schematically in Fig. 3.

For the sake of clearness the diagram in Fig. 3 shows various features in exaggerated form. The layer 22 of the cable unit 10 is applied with a constant pitch or constant angle of lay throughout the length of a cable section, such as can be conveniently manufactured and handled. Thus the conductor unit 22a of the layer 22 may be traced along a fixed spiral line beginning at the top of the figure on the back side of the cable, passing through point 31 to the front side, again to the back at point 32 and again to the front at point 33, and so on, the angle of lay being constant, as represented by the angle b between a projection of the conductor and the axis of the cable. The pitch as measured between points 31 and 33 may conveniently be two feet.

Of the zigzag layer 21 placed about the layer 22 only a single conductor unit 21a is shown in this diagram. Conductor 21a may be traced beginning at the top of the figure as passing from the back of the cable through the point 31 to the front of the cable to the changing point 34, the angle of lay a for this distance being greater than the angle b for layer 22. The angle of lay for conductor unit 21a then changes at point 34 and the conductor passes through point 35 to the back of the cable, continuing in this manner for say fifty feet with an angle of lay c smaller than angle b, whereupon another changing point (not shown) will be reached and the angle of lay again will be made equal to angle a.

It will thus be apparent from the diagram and the description thereof that on the side above the change point 34 the conductor 21a crosses conductor 22a in one direction at the point 31 and that on the side below point 34 conductor 21a crosses conductor 22a in the opposite direction at point 36. In this manner each conductor in the layer 21 crosses a conductor in layer 22 once between two successive change points, and for convenience in manufacture each conductor in layer 21 may be caused to cross not more than half the conductors in layer 22 between successive change points, or in other words the layer 21 is shifted through 180 degrees relative to layer 22 alternately in opposite directions. It is thus apparent that a conductor unit such as the unit 21a, instead of being in close proximity throughout the length of the cable section, to a conductor unit, such as unit 22a, in an adjacent layer, will be repeatedly crossing a large number of conductors in the adjacent layer, and the interference effect at each crossing will be practically insignificant. The possibility of the interference effects between adjacent layers becoming disturbing is thus greatly reduced. It will furthermore be apparent from this diagram that the conductors in the zigzagging or oscillating layers by this arrangement follow continuous, though changing, spirals about the cable and that thus a cable is obtained the mechanical structure of which in appearance and handling differs very little, if any, from the ordinary spiralled cables, and especially from those of the "unit" type.

A cable unit of twenty-five quads may, for example, be built up with three twisted conductor units in the center, a first layer of eight conductor units applied with a constant angle of lay and a second layer of fourteen conductor units running in zigzag lines relative to the first layer.

A cable with fifty conductor units may be built up with one unit in the center, a first layer of five units in a uniform spiral, a second layer of ten zigzagging units, a third layer of fifteen units in a uniform spiral and a fourth layer of nineteen zigzagging units.

If necessary the conductors in the zigzagging layers may be held in place by a cotton binding 15 or other convenient means, which binding may be applied continuously during the stranding operation. Such a binding is usually applied about the outermost layer of a cable unit.

It should be understood that the invention is not limited to conductor groups such as used in the unit type of cable shown in Fig. 1. It is within the scope of the invention to construct a cable such as that shown in Fig. 2 and apply any desired covering thereto, such as a layer of protecting insulation and a lead sheath corresponding to the layers 11 and 12 in Fig. 1.

It should furthermore be understood that the principal object of the invention is to obtain repeated crossings in opposite directions between the conductors in adjacent layers in a manufacturing section of cable, and that this can be attained in various ways in accordance with the invention. Thus it is not essential that the conductors of alternate layers be applied with a constant angle of lay; the arrangement should preferably be such that the conductor units in two adjacent layers will form continuous spirals in the same direction about the axis of the cable, that parallelism between two adjacent layers be avoided except for short stretches at reversal points, and that the angle of lay in either or both of two adjacent layers be continuously or intermittently changed in opposite sense so that the conductors in one layer will cross some or all of the conductors in the adjacent layer alternately in opposite directions and approximately at the same relative angle.

What is claimed is:

1. A section of cable containing a plurality of individually insulated conductor units, one of said units being placed to follow a path throughout the length of said section and another of said units being placed to follow another path throughout the length of said section, said paths being such that said other unit engages and crosses the first said unit at each of a plurality of points along said section and the angle of crossing being alternately of opposite direction to reduce interference between said crossing units said paths being located entirely in different concentric layers.

2. In a section of multiple conductor signaling cable a plurality of individually insulated conductor units placed in a layer with their center lines running substantially parallel, and another insulated conductor unit placed in a layer adjacent said plurality of units to have its center line running along the cable section in a zigzag line with respect to said plurality of units.

3. In a section of multiple conductor signaling cable a plurality of individually insulated conductor units placed in a plurality of substantially concentric layers, the units in one of said layers each being placed with a spiral lay about the axis of the cable, the angle of lay repeatedly alternating along the cable section from one value to another value.

4. In a section of cable a plurality of individually insulated conductor units placed in a plurality of substantially concentric layers, the units of one of said layers each being gradually shifted in one direction through an angle of about 180 degrees relative to an adjacent layer in a portion of said section, and in the opposite direction through about 180 degrees in an adjacent portion of said section.

5. A section of signaling cable comprising a plurality of individually insulated conductor units placed in a plurality of substantially concentric layers, the units in alternate layers forming spiral lines of substantially constant pitch about the axis of the cable, and the units in a layer between two of said alternate layers forming spiral lines alternating in pitch at intervals along the cable section from one longer to one shorter than said constant pitch.

6. A multi-conductor signaling cable section having the conductor units placed in a plurality of concentric layers, characterized in this that the conductor units in one layer and the conductor units in a contiguous layer are placed to cross each other alternately in opposite directions a plurality of times along the cable section to reduce interference action between the conductor units in said contiguous layers.

7. A method of stranding a section of multiconductor cable which comprises stranding a layer of conductors with a uniform pitch and stranding an adjacent layer with an average pitch substantially equal to said pitch and alternately increasing and decreasing the pitch of said adjacent layer at intervals during the stranding of said section.

8. In a section of a multiple conductor signaling cable having the conductor units arranged in substantially concentric layers a first insulated conductor unit located entirely in one of said layers and a second insulated conductor unit located entirely in another of said layers, said units running lengthwise throughout the said section along helical paths of substantially constant average pitches, the angle of lay of both conductor units being in the same direction and the pitch of said first conductor unit being alternately greater and smaller than that of said second conductor in successive portions along the length of said section to reduce interference between the circuits in said first conductor unit and the circuits in said second conductor unit.

9. A manufacturing section of a multiple conductor signaling cable having a centrally disposed group of insulated conductor units, a first layer of insulated conductor units applied uniformly about said group with a uniform lay, a second layer of insulated conductor units applied uniformly about said first layer with a zigzag lay and a third layer of insulated conductor units applied uniformly about said second layer with a uniform lay.

10. A method of stranding a section of multiconductor signaling cable which comprises stranding a uniform layer of conductors and stranding another uniform layer of conductors, the average pitch and direction of lay of said first layer being substantially the same as of said second layer and the pitch of stranding of at least one of said layers being repeatedly varied between a higher and a lower value than the said average pitch to produce a zigzag relation between the conductors in said first layer and the conductors in said second layer.

ARTHUR G. HALL.